United States Patent

Gillespie

[15] 3,660,024
[45] May 2, 1972

[54] PROCESS FOR AMMONIA OXIDATION
[72] Inventor: George Richard Gillespie, New York, N.Y.
[73] Assignee: Engelhard Minerals & Chemicals Corporation
[22] Filed: Sept. 11, 1970
[21] Appl. No.: 71,560

Related U.S. Application Data

[63] Continuation-in-part of Ser. No. 2,255, Jan. 12, 1970, abandoned.

[52] U.S. Cl. ................................................23/162, 252/477
[51] Int. Cl. .........................................................C01b 21/26
[58] Field of Search ..............................23/162, 1 E; 252/477

[56] References Cited

UNITED STATES PATENTS 1,318,936   10/1919   Toniolo ..................................23/162
3,434,826   3/1969    Holzmann............................23/162 X

FOREIGN PATENTS OR APPLICATIONS 542,330   1/1942   Great Britain..........................23/162

Primary Examiner—Oscar R. Vertiz
Assistant Examiner—G. O. Peters
Attorney—Miriam W. Leff and Samuel Kahn

[57] ABSTRACT

In an ammonia oxidation process wherein ammonia and an oxidizing gas are contacted with a multilayer pad of platinum metal catalyst, a method is provided for reducing the amount of platinum metal catalyst required. The optimum amount of catalyst needed for a 95 percent ammonia conversion is reduced by replacement of a significant fraction of the gauze with a non-precious metal corrosion resistant foraminous structure which simulates the flow resistance of the fraction of catalyst gauze removed from the optimum pad. The resulting catalyst pack comprising platinum metal gauze and foraminous structure is equivalent in ammonia conversion to the optimum pad and the volatilization of the platinum metal gauze is materially reduced.

5 Claims, 5 Drawing Figures

INVENTOR.
GEORGE RICHARD GILLESPIE

ATTORNEY

PROCESS FOR AMMONIA OXIDATION

This application is a continuation-in-part of copending application Ser. No. 2,255, filed Jan. 12, 1970, now abandoned.

BACKGROUND OF THE INVENTION

The invention relates to an improvement in ammonia oxidation processes which use platinum metal gauze catalysts. It is particularly concerned with reducing the quantity of platinum metal catalyst in such a process with no reduction in conversion efficiency.

In the commercial production of nitric acid ammonia gas mixed with an oxidizing gas, e.g., air, is passed over a platinum metal gauze catalyst at an elevated temperature, e.g., 650° to 1,000° C. to obtain nitrogen oxides. Pressures varying to 110 pounds per square inch, and higher have been used. The effluent gas from the ammonia converter which contains nitrogen oxides is then further treated to obtain nitric acid.

The platinum metal catalyst is usually a multilayer pad about 16-60 inches dia. in the form of 80 mesh screens of 3 mil wire. Traditionally the weight of the pad is equivalent to 2 troy ounces per daily ton of capacity, and a pad may consist of 10 to 50 of these expensive screens. It has been found that this amount of platinum is required to achieve high conversion for reasonable lengths of time during operation of a unit.

Examination of a used catalyst reveals that a visible change in the surface appearance of some of the screens takes place whenever the reaction occurs. The change in appearance decreases as one looks towards the bottom of the catalyst pad. Interestingly, the final screens of the pad show no evidence of a reaction taking place; yet if the final screens are removed, many problems are introduced. For example, as the catalyst loading is reduced below about 2 troy ounces per daily ton of nitric acid the process becomes increasingly less efficient. At 1 troy ounce the process is marginal and incomplete and below about 0.5 troy ounce the process is hazardous since an explosive mixture is produced downstream of the catalyst. Thus it has been important to use enough screens so that the conversion is complete. It will be appreciated, however, that the screens are very expensive and it would be a great advantage to reduce the number of screens required to effect this complete conversion.

A method has now been found which uses less of a platinum metal quantity than previously required to achieve a comparable conversion efficiency. This not only results in a savings in cost but also permits a more economic operation of a plant within the limits of safety. This is achieved by substituting a non-precious metal structure for some of the platinum metal screens formerly required for optimum conversion.

It can be noted that one of the reasons often given for using many layers of the platinum metal screens is that the extra layers of gauze are needed as back-up layers when the front layers deteriorate to reduce the number of shut-downs for replacement and repairs. Experience has shown, however, that the catalyst fails because of deterioration of the top catalyst layers and subsequent loss of catalytic efficiency before any substantial change in the appearance of the bottom layers is noted. As noted above, however, if too few screens are used, the conversion efficiency does not reach the optimum level. In the present process, despite the fewer layers of platinum metal screens, the catalyst does not require replacement more frequently than those of the prior art.

The combined catalyst pack has advantages in addition to the savings in cost of precious metal catalyst. Among the benefits is the surprising reduction in the volatilization of platinum gauze. As is well known in art, it is expected that about 0.012 troy ounce of platinum group metal volatilizes from the precious metal screens for each ton of nitric acid produced in a high pressure plant. Unexpectedly, using the combined catalyst pack of the present invention, this volatilization is reduced considerably, of the order of 25-30 percent.

Another benefit is that the foraminous pad has been found to function as a getter for some precious metals volatilized during the process.

A further noteworthy advantage of the present invention is that it can be used in existing equipment.

INVENTION

This invention applies to processes for the oxidation of ammonia to oxides of nitrogen wherein an admixture of ammonia and an oxygen-containing gas is contacted in a reactor at elevated temperature and pressure with a catalyst pad composed of platinum metal gauze. It is specifically concerned with reducing the platinum gauze required in the process.

In accordance with this invention, in a process for the oxidation of ammonia to oxides of nitrogen wherein an admixture of ammonia and an oxygen-containing gas is contacted in a reactor at elevated temperature and pressure with a catalyst pad composed of from about 10 to 50 layers of platinum metal gauze, a method is provided for reducing the amount of platinum group metal gauze catalyst which comprises, determining the optimum amount of gauze required for obtaining at least about 95 percent conversion of ammonia to nitrogen oxides, determining the pressure drop across said catalyst gauze pad under the reaction conditions, replacing from about one-third to two-thirds of said catalyst gauze pad with a foraminous structure of a corrosion resistant non-precious metal, said structure having a porosity such that the total pressure drop across the remaining gauze plus the foraminous structure is substantially equal to that of the optimum catalyst gauze pad, and effecting the ammonia oxidation.

As a direct result of using the process of this invention it is possible to operate a nitric acid plant using less than the platinum metal gauze previously considered essential for efficient $NH_3$ conversion. Specifically the process can operate effectively using less than the traditional 2 troy ounces of Pt metal gauze per daily ton of nitric acid, e.g., about 0.5 to less than 2 troy ounces and preferably using about 0.5 to 1.5 troy ounces of platinum metal per daily ton of nitric acid capacity.

The foraminous structure which is substituted for the gauze is made of a non-precious metal in the form of a randomly oriented open metal mesh. The metal must be capable of withstanding the severe operating conditions and the corrosive environment. For example, Inconel and Nichrome and generally desired temperature nickel and chromium containing alloys are suitable metals. The foraminous structures with randomly oriented wires can be fabricated from a knitted metal mesh in accordance with well-known techniques, such as described in U.S. Pat. No. 2,334,263. They can also be made out of metal foam or felted metal. The amount and thickness of the metal used depends upon the desired pressure drop for the entire pack at the given reaction conditions. The openings of the structure form no uniform pattern and the pad has a resistance to flow which effects a uniform pressure drop across the structure.

The catalyst gauze and foraminous structure are the essential components of the catalyst pack. One or more conventional getters and/or corrosion resistant weld-barrier screens may be present in the catalyst pack between the catalyst gauze and foraminous structure. A suitable getter is, for example, a fine mesh woven netting of gold or a gold alloy such as disclosed in U. S. Pat. No. 3,434,826. The purpose of the screens is to serve to prevent welding between any of the various components of the catalyst pack at the operating conditions. Suitably, Nichrome screens may be used. It is essential that the catalyst gauze and the foraminous structure be immediately adjacent to each other except when separated by the insertion of getters and/or weld-barrier screens. Under the latter conditions the components must be present contiguously in the total catalyst pack. It has been found that the getters and screens give substantially no contribution to the pressure drop across the catalyst pack.

The pressure drop across the catalyst pack is a critical feature of this invention. The optimum pressure drop in a conventional catalyst can be determined by well known techniques and the optimum pressure drop can be simulated in the present combined structure using the same established methods. It is not known, however, if the foraminous pads merely serve to improve the resistance to gas flow, thus improving the gas distribution across the catalyst pad. It was found, for example, that a simple replacement of 80-mesh Nichrome screens for the precious metal gauze would not work. Fine mesh Nichrome screens do not retain integrity under the severe operating conditions of the converter. Within a short period of time catastrophic oxidation of the metal occurs resulting in collapse of the screen and an accompanying high resistance to normal gas flow. On the other hand pads having a randomly oriented open metal mesh, i.e., having the metal strands which interlaced the structure across the depth as well as across the face to form a structure having a uniform density and having the porosity which would effect the desired pressure drop, were found to be effective. As a practical matter, the pads can be designed with dimensions to fit in any given converter as replacement for part of the catalyst gauze without modification of the equipment and yet satisfy the criteria of uniform density, strength, and predetermined pressure drop.

The invention will be more fully understood by reference to the accompanying drawings and examples which illustrate an embodiment of this invention.

THE DRAWINGS

Figure 5:
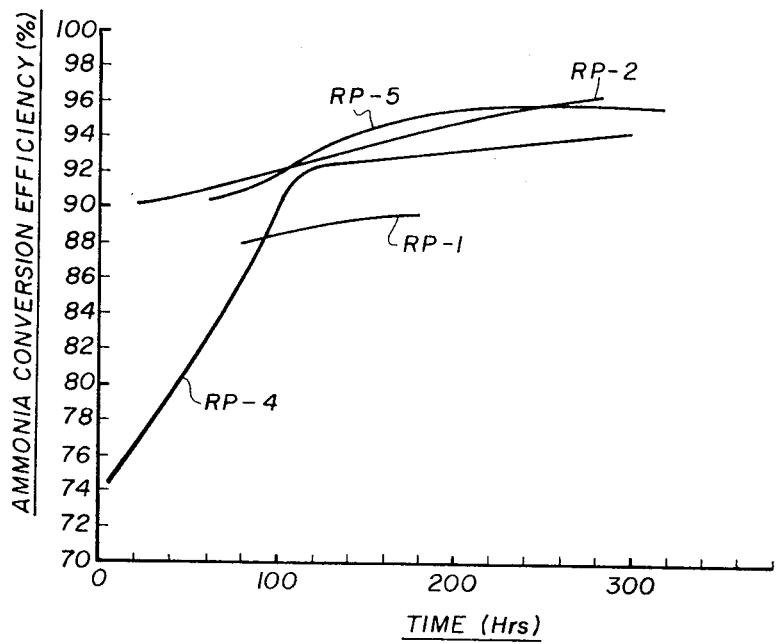

FIG. 5 shows the plot of four curves representing different catalysts and the ammonia conversion efficiency of such catalysts plotted against hours. The curves compare the efficiency of multilayer platinum metal catalysts having 10 and 20 layers of gauze with catalysts having a foraminous structure substituted for 10 of 20 layers, in accordance with this invention.

Figure 1:
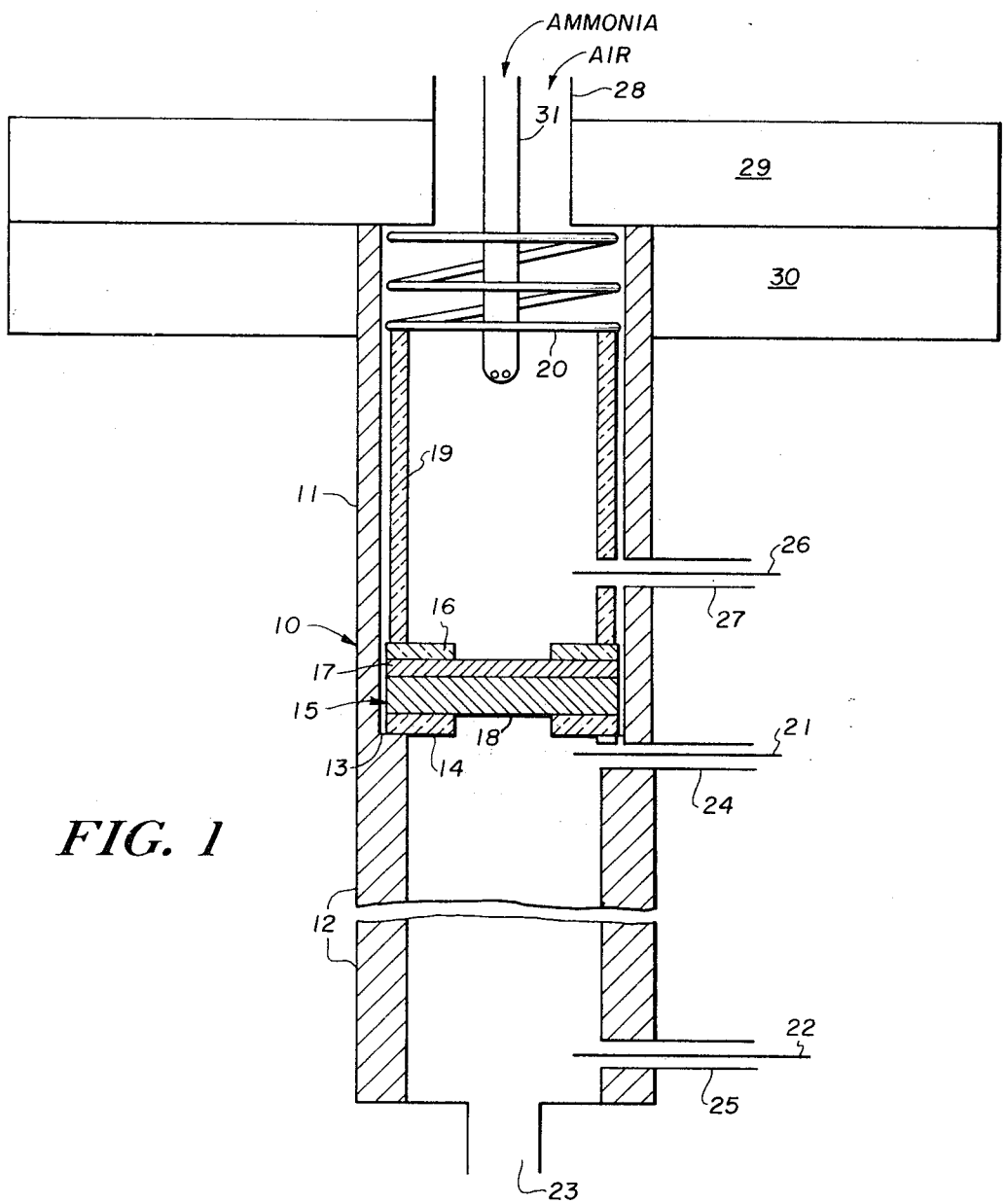
FIG. 1 is a schematic representation of an ammonia oxidation apparatus. The embodiment is shown with a catalyst pack, i.e., including the gauze and foraminous pad in accordance with this invention.

Referring to the ammonia oxidation apparatus shown schematically FIG. 1, this apparatus was used to test various catalysts. In the apparatus the reactor 10 consisted of a reactor shell 11 which was 2 inch O.D. × 0.120 inch wall × 12 ½ inch length stainless steel tube, to which a 2 inch O.D. × 0.375 inch wall × 24 inch length stainless steel tube 12 was welded. The zone 13 at which they were welded was used to retain a 0.840 inch I.D. × 1.50 inch O.D. quartz ring 14 on which the catalyst pack 15 was placed. A second quartz ring 16 of the same size as ring 14 was placed on top of the catalyst pack 15. In the drawing the catalyst pack consists of a multilayer pad 17 of platinum metal gauze, e.g., having 10 to 20 layers, and a foraminous structure 18. The catalyst pack 15 was held in place by a quartz liner 19 which was below a compression spring 20. Spring pressure of spring 20 was used to hold the catalyst pack 15 in place and prevent channeling past the catalyst. The quartz liner 19 served to prevent the ammonia reaction with the hot metal reactor shell walls. Quartz wool (not shown) was packed between the liner 19 and the reactor shell 11 to prevent gas bypass of the active catalyst surface which was 0.840 inch in diameter.

Thermocouples 21 and 22 were used, respectively, to record the temperature one-fourth inch below the catalyst pack 15 and at the reactor bottom outlet 23, respectively. The thermocouple taps 24 and 25 were also used to take gas samples from a gas flow stream when the unit was in operation. Thermocouple 26 and tap 27 placed above the catalyst pack 15 were used to measure the temperature and take sample taps upstream of the catalyst. The inlet conduit 28 for air was attached to the reactor 10 by 150 pound flanges 29 and 30, respectively.

In operation an experiment was started by pressurizing the apparatus with nitrogen and preheating the nitrogen to 280° C. When 280° C. gas temperature was achieved, air was substituted for the nitrogen and the flow adjusted to the proper value. The air from a compressor, (not shown) was filtered and dried and fed through a rotameter (not shown) at 360 standard cubic feet per hour (SCFH) into a preheater (not shown) which brought the air temperature to 280° C. Ammonia was vaporized from a heated cylinder (not shown) of compressed ammonia through a filter (not shown) to remove particulate matter. The ammonia was fed gradually through a rotameter (not shown) into the preheated air at 40 SCFH. This preheated 90 percent air-10 percent ammonia gas mixture was fed into the reactor 10. The mixing of the ammonia and air to give the 10-90 percent mixture was done with a sparging tube 31 from which ammonia was added into the preheated air. The total gas feed to the reactor was 400 SCFH and the linear velocity was 27 feet per second. The reactor pressure was 70 psig. Ammonia was very gradually introduced and reactive ignition was observed by a sudden increase in temperatures.

Flow of the ammonia was adjusted to proper value and analytical samples were taken at regular intervals.

Analysis of the gas feed was accomplished by purging a sampling bulb with a portion of the gas feed at ambient temperature and then closing the bulb. An excess of $0.1N$ $H_2SO_4$ solution was added to the bulb and the acid back titrated with $0.1N$ NaOH to determine the $NH_3$ volume percent by difference. Simultaneously an evacuated flask was filled to atmospheric pressure with a sample of product gas at 100° C. The resulting $NO+NO_2$ gas mixture was oxidized with excess $H_2O_2$ to yield a solution of nitric acid. The nitric acid was titrated with 0.1 NaOH to determine the total nitrogen oxides in volume percent. Conversion efficiencies were calculated after gas volume corrections were made as:

$$\text{Conversion efficiency (percent)} = \frac{\text{Vol percent } NO_x}{\text{Vol percent } NH_3}$$

Pressure drops were measured with a differential mercury manometer.

Figure 2:
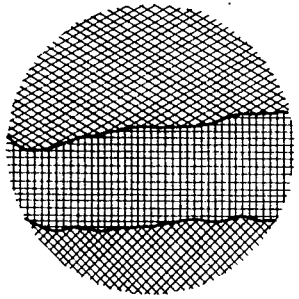
FIG. 2 is a plan view of a multilayer platinum metal gauze catalyst pad, with portions thereof partly cut away.

FIG. 2 is a plan view of a multilayer gauze pad, in which 80 mesh gauze is made from 3 mil wire of a platinum-10 percent rhodium alloy, i.e. an alloy containing 90 percent platinum and 10 percent rhodium. Usually 10 to 50 of such gauze layers are used as a catalyst pack for the oxidation of ammonia. In the figure portions of the top layers are partly cut away.

Figure 3:
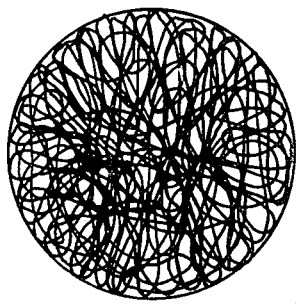
FIG. 3 is a plan view of a foraminous pad.

FIG. 3 is a plan view of a foraminous pad fabricated by compressing a sleeve made of a ribbon of knitted metal mesh. The metal is 11 mil wire of Inconel. The material used is available commercially as a knitted sleeve of a loose mesh either of Nichrome or Inconel. The foraminous pad is formed by winding the sleeve to fill a mold of stainless steel and compressing to a required density to give the desired pressure drop.

Figure 4:
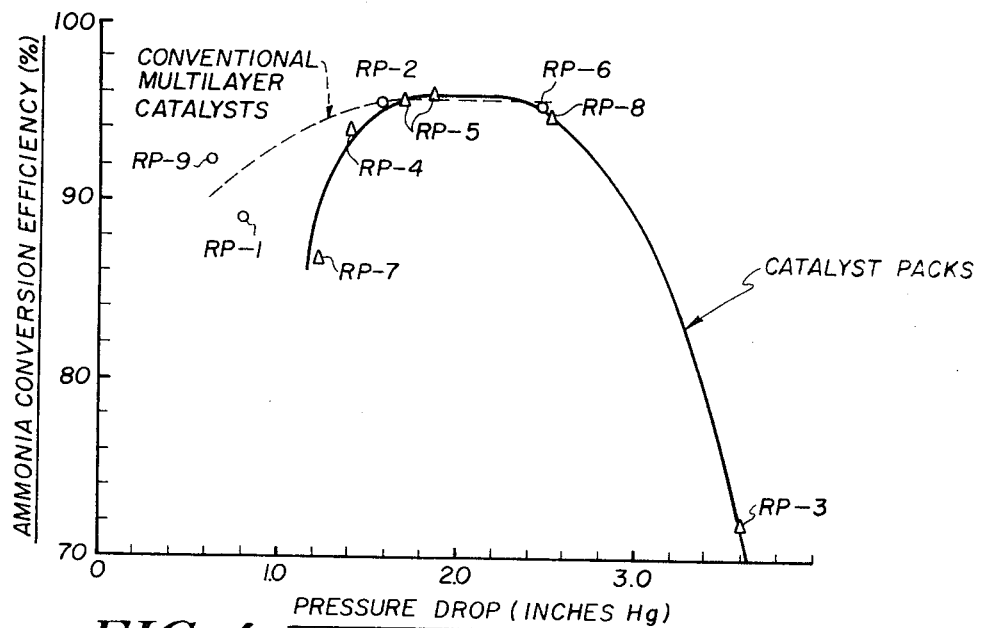
FIG. 4 shows two curves in which the pressure drop in an ammonia oxidation reactor is plotted against the ammonia conversion efficiency using results obtained with various catalysts.

FIG. 4 shows the effect of pressure drop on the ammonia conversion efficiency. The pressure drops were the mean value for the last 50 hour intervals during which the ammonia conversion efficiency was at a maximum or steady value for the experiment. The ammonia conversion efficiency was the average value for that 50 hour interval. The pressure drops were taken with a differential manometer whose sampling taps were located above and below the catalyst gauze and foraminous structure. Conversion efficiencies were determined by the method previously described. The dashed line in FIG. 4 represents the results using conventional multilayer gauze catalysts, and the solid line the results with various catalyst packs containing foraminous pads.

FIG. 5 shows the conversion efficiency results of ammonia oxidation tests with different catalysts. The tests will be more fully described in connection with the examples below.

EXAMPLE 1

Samples of conventional multilayer ammonia oxidation catalysts were prepared having 4, 5, 10, 20, and 30 layers of Pt–10 percent Rh alloy 80 mesh gauze of 3 mil wire, such as illustrated in FIG. 2. Foraminous pads were prepared from a ribbon of knitted 11 mil Inconel wires which were compressed in a cylindrical mold of 1 ½ inches in diameter to a thickness of 0.170 inches, 0.200 inches or 0.225 inches. The 0.170 inch thick pads were made from a 3 inch wide Inconel knit sleeve of 7 inches in length, with 2.5 tons pressure used to compress the rolled sleeve. The 0.225 inch thick pads were made from a 6 inch wide Inconel knit sleeve of 9 inches in length, with 33 tons pressure used to compress the rolled sleeve. The 0.200 inch thick pads were made from a 3 inch wide Inconel knit sleeve of 9 inches in length, with 2.5 tons pressure used to compress the rolled sleeve. The weight of the 0.170 inch thick pads were approximately 9.85 grams, that of the 0.200 inch thick pads was 13.10 grams and that of the 0.225 inch thick pad was 32.91 grams.

The pressure drop across various gauzes and pads were determined separately at 30° C., 250 SCFH air flow and 70 psig. Although the conditions chosen are less severe than the ammonia oxidation operating conditions, these tests were used to choose Inconel pads to be tested with Pt–10 Rh gauze in the experiments. The pressure drop of a foraminous pad measured at 30° C. is generally about 10 percent lower than that measured for the same pad under ammonia oxidation conditions. However, it is possible to approximate the range of pads that might give the desired pressure drop at the operating conditions. The pressure drops at the less severe conditions are recorded in TABLE I.

TABLE I

Pressure Drop Measurements at 30° C., 250 SCFH Air Flow and 70 psig Pressure

| Catalyst Gauze | Pressure Drop (inches Hg) |
|---|---|
| 10 layers Pt–10% Rh | 0.6 |
| 20 layers Pt–10% Rh | 1.2 |
| 30 layers Pt–10% Rh | 1.8 |
| Foraminous Structure | |
| 0.170 inch Inconel Pad | 0.8 |
| 0.200 inch Inconel Pad | 1.2 |

EXAMPLE 2

Various catalysts were tested using the apparatus and procedure described in connection with FIG. 1. The catalysts tested included catalysts of a conventional multilayer gauze type having 10 layers (Exps. RP–1 and RP–9), 20 layers (RP–2), and 30 layers (RP–6) of Pt–10 Rh gauze. The catalyst packs, used in experiments RP–3, RP–4, RP–5, RP–7, and RP–8, were composed of four, five, and 10 layers of Pt–10 Rh gauze and a foraminous Inconel pad (FIP) of 0.170, 0.200, or 0.225 inch thickness, as shown in TABLE II. The tests were run for 150 to 600 hours and the ammonia conversion efficiency and pressure drop were determined. The ammonia conversion efficiency was determined in the last 50 hours of operation. The results are recorded in TABLE II and plotted in FIGS. 4 and 5.

TABLE II

| Expt. No. | Catalyst Pack | Hours Run | NH₃ Conv. Eff. (%) | Pressure Drop (Inches Hg) |
|---|---|---|---|---|
| RP–1 | 10 Layers Pt–10% Rh | 151 | 89.4 | (0.8)* |
| RP–2 | 20 Layers Pt–10% Rh | 330 | 95.9 | 1.55 |
| RP–3 | 4 Layers Pt–10% Rh & 0.225" FIP | 159 | 72.3 | 3.60 |
| RP–4 | 10 Layers Pt–10% Rh & 0.170" FIP | 294 | 94.5 | 1.40 |
| RP–5 | 10 Layers Pt–10% Rh & 0.200" FIP | 297 | 95.8 | 1.65 |
| RP–6 | 30 Layers Pt–10% Rh | 317 | 95.5 | 2.45 |
| RP–7 | 5 Layers Pt–10% Rh & 0.200" FIP | 294 | 87.1 | 1.25 |
| RP–8 | 10 Layers Pt–10% Rh & 0.200" FIP | 628 | 94.8 | 2.50 |
| RP–9 | 10 Layers Pt–10 Rh | 373 | 92.1 | 0.60 |

*calculated from the values for RP–2 and RP–6.
FIP = Foraminous Inconel Pad

Reference to Table II and FIG. 4 shows that at a pressure drop between about 0.7 and 3.0 inches Hg, conversion efficiency is over about 90 percent, and that there is an optimum pressure drop range, viz. about 1.5 to 2.5 inches Hg, in which the ammonia conversion efficiency is at a maximum of about 95 to 96 percent. Pressure drops above and below the optimum resulted in poorer conversion efficiencies. Tests RP–2 (20 layers of gauze) and RP–6 (30 layers of gauze) showed that both these catalysts effected the conversion with over 95 percent efficiency. In the tests using catalysts having less than 20 layers of gauze, a foraminous pad was added to bring the pressure drop of the catalyst into the optimum range, as determined by RP–2 and RP–6. In the experiments the catalysts of RP–4 and RP–5 most closely simulate the pressure drop of the 20 layer catalyst, and the catalyst of RP–8, most closely simulates the pressure drop of the 30 layer catalyst. The results of tests RP–4, and RP–5, and RP–8 show that the combined catalyst packs in accordance with this invention effected the conversion substantially matching the high conversion efficiency, i.e., about 95 percent, of the optimum conventional catalyst gauze pads.

As indicated above, RP–1 and RP–9 were run using only 10 layers of Pt–10 Rh gauze as the catalyst. When a foraminous Inconel pad was used with 10 layers of Pt–10 Rh gauze as in RP–4, RP–5 and RP–8, dramatic improvement in ammonia conversion efficiency resulted from the higher pressure drop. RP–3 represented a case wherein the number of layers of gauze was reduced to four and a thicker foraminous Inconel pad was used. The pressure drop was too high and results were lower than the optimum conversion.

In these laboratory experiments the layers of gauze corresponded to the platinum metal catalyst loading roughly as follows: four layers to 0.4 troy ounce; five layers to 0.5 troy ounce; 10 layers to 1 troy ounce; 20 layers to 2 troy ounces; and 30 layers to 3 troy ounces of Pt metal per daily ton of nitric acid. Commercially it is the practice to use catalyst loading of at least about 2 troy ounces to obtain a conversion of about 95 percent and a catalyst loading of less than about 0.5 troy ounce is considered dangerous. The data show that operation with 10 gauzes, corresponding to 1 troy ounce was marginal. Experiments RP–4, RP–5 and RP–8 showed that when using a catalyst pack in accordance with this invention, optimum conversion could be achieved at this low platinum metal catalyst loading. Experiment RP–7 represented results for five layers of Pt–10 Rh gauze on a foraminous Inconel pad and indicated that the conversion, while not optimum, runs satisfactorily and a plant would safely operate in this range. Thus the safe operating range was increased by use of the present invention.

The results in TABLE II and FIG. 4 show that the pressure drop created by the Inconel foraminous pads directly affects the ammonia oxidation to a great extent as their flow resistance simulates that for the number of catalyst layers replaced.

The present tests were conducted at a linear velocity of 27 feet per second. For plants operating at medium and high pressures, linear velocity may vary from about 15 to 80 feet per second. Suitable pressure drop has been determined as between about 0.7 to 3.0 inches Hg and preferably 1.5–2.5 inches of Hg for plants operating at a linear velocity of 27 feet per second. For plants operating at other linear velocities, the optimum pressure drop will vary according to the linear velocity and this can be calculated from the equation:

$(v)^{1.6}/A =$ pressure drop range (inches of Hg)

where $v =$ the actual linear velocity of the gas leaving the catalyst pack (feet per second)

and $A = 60$ to $350$

It is well known that new platinum metal catalyst gauze requires a certain period of operation before the gauze wires become "sprouted" sufficiently to give optimum results for ammonia oxidation efficiency. FIG. 5 shows the oxidation efficiency plotted against hours on stream for the experiments identified in TABLE II as RP–1, RP–2, RP–4, and RP–5. Comparison of the "break-in" periods for the conventional catalysts and the combined catalyst packs of this invention show that the period of break-in for the conventional 20 layer catalyst (Exp. No. RP–2) is about the same as the catalysts of this invention, which had only 10 layers of platinum metal gauze. (Exp. RP–4 and RP–5). With respect to these combined catalyst packs of this invention, once the Inconel pad has oxidized enough so that no further oxidation takes place and subsequent wire diameter increase occurs, no change in the pressure drop or ammonia conversion efficiency can be noted. The Inconel foraminous pad retains its mechanical strength despite the heavy oxide coating. It will also be noted from FIG. 5 that the catalyst packs of this invention (Exp. Nos. RP–4 and RP–5) retained their high efficiency over the 300 hours of testing. Indeed, the results show the catalysts of tests RP–4 and RP–5 performed comparably to the conventional 20 layer catalyst used in Exp. No. RP–2, despite the reduced amount of platinum metal gauze in the reactor. The results in TABLE II show that the catalyst pack of Exp. No. RP–8 retained its high efficiency for 628 hours with the same amount of catalyst gauze as used in tests RP–4 and RP–5.

EXAMPLE 3

A large scale experiment showed the efficacy of the described invention. A catalyst charge of 48.9 troy ounces of platinum-rhodium alloy gauze was used on an Inconel pad of 0.170 inch thickness and approximately 3.5 pounds weight. Between the Inconel pad and the gauze three weld-barrier screens of Nichrome alternated with two getter screens of a Pd-Au alloy were inserted, the whole catalyst pack being contiguous. The hexagonal converter used was 16 inches across the faces and the optimum gauze charge required for 95 percent ammonia conversion would have been 120 troy ounces of platinum rhodium alloy gauze. At an acid production rate of 55.4 tons per day expressed as 100 percent nitric acid, the ammonia conversion efficiency averaged 95 percent for a 2 week period of operation.

EXAMPLE 4

Several tests were performed in a nitric acid converter having a capacity of approx. 60 tons per day. A standard run was made using a conventional Pt-Rh gauze catalyst at a loading of 120 troy ounces of precious metal (about 48 screens). In each of the tests using catalysts in accordance with this invention, roughly 60 percent of the normal gauze loading was replaced by a foraminous pad. Typical results are summarized in TABLE III.

TABLE III

SUMMARY OF TEST RESULTS IN 60 TON/DAY CONVERTER

| Test No. | Conventional Opern. | A | B |
|---|---|---|---|
| Gauze Loading (T oz.) | 120 | 48.9 | 49.7 |
| Hours Run | 500–1000 | 671 | 881 |
| Ammonia Conv. Effcy. (%) | 95.6 | 92.7 | 94.7 |
| Acid Strength(%) | 55 | 55.3 | 55.5 |
| Production Rate Tons/Day 100% Acid | 54 | 56.6 | 54.6 |
| Platinum Loss T oz/day | 0.65 | 0.48 | 0.49 |

In TABLE III: Normal operation refers to a run using only a conventional Pt-Rh gauze catalyst at a loading of 120 troy ounces, or about 2.2 troy ounces per daily ton. Test A refers to a rest in which a foraminous Inconel pad of 0.2–0.3 inch thickness was substituted for about 60 percent of the gauze. In test B a foraminous Nichrome pad of 0.2–0.3 inch thickness was substituted for about 60 percent of the gauze. On the basis of laboratory experiments the combined catalyst packs simulated the pressure drop of the standard run.

Test A ran satisfactorily for 28 days without loss of conversion efficiency. An increase in acid production over normal operation was noted. The pad was carefully examined. Photomicrographs show that the wires were in good condition. An oxide coating which formed showed as dark areas on the light colored wires. The oxide coating did not penetrate the metal deeply and the pad retained its strength without buckling. An assay of this pad shows that the platinum content was just detectable, yet 0.30 ozs. of rhodium were gettered. This was a 35 percent recovery efficiency. These results parallel laboratory experiment assays.

Test B, conducted with a Nichrome pad was run for 37 days with ammonia conversion efficiency and nitric acid production comparable to normal runs.

The test results show that using the catalyst in accordance with this invention, 60 percent less gauze loading can be used to achieve the same ammonia conversion efficiency obtained with a conventional gauze catalyst, and the combined catalyst pack can give equivalent or possibly greater acid production and equivalent acid strength as the conventional gauze catalyst. Moreover, the platinum losses by volatilization were reduced by at least 25 percent by the use of the foraminous pad, which also serves as a getter for rhodium.

The substantial reduction in the volatilization of platinum was surprising and represents a substantial savings in the cost of operation. It was found that in a conventional unit the majority of the volatilization takes place in the top 4–6 layers of gauze, that is, it is not evenly distributed throughout the gauze. Thus, on this basis, the amount of volatilization platinum metal should be the same whether a conventional catalyst or a catalyst of this invention is used. As noted, however, in all experiments the reduction in volatilization was reduced by 25–30 percent of that normally volatilized. It is believed that by the use of the catalyst of this invention there is a reduction in temperature fluctuation with a resultant reduction in localized heating of the gauze.

EXAMPLE 5

In a converter having a capacity of 165 tons of nitric acid per day tests were made using a conventional catalyst gauze at a catalyst loading of 330 troy ounces (or 2 troy ounces per daily ton) and catalyst packs in which 55 percent of the gauze was replaced by a foraminous pad in accordance with this invention. The foraminous pads used in this test was a sectionalized pad constructed of Nichrome 0.2–0.3 inch thickness. On the basis of the laboratory experiments, the total pressure drop in the unit of the combined catalyst pack simulated the pressure drop of the conventional catalyst. The results of the tests are summarized in TABLE IV.

TABLE IV

SUMMARY OF TEST RESULTS IN 165 T/DAY CONVERTER

| Test | Average for Many Conventional Opern. | A1* | A-2 |
| --- | --- | --- | --- |
| Gauze Loading (T. oz.) | 330 | 149.5 | 138 |
| Hours Run | 1000–1200 | 1334 | 1380 |
| Ammonia Conv. Effcy. (%) | 95–97 | 95.9 (96.6 – 1st 988 hours) | 96.3 |
| Acid Strength (%) | 56 | 56 | 56 |
| Production Rate Tons/day 100% Acid | 165 | 165 | 165 |
| Platinum Loss T oz/day | 1.72 | 1.29 | 1.23 |

*2 Pd-Au Getter Sheets used below gauze

The results show that the catalysts in accordance with this invention have a catalyst life ammonia conversion efficiency comparable to a conventional catalyst, with platinum metal volatilization losses reduced by over 25 percent.

It will be appreciated that the foregoing specific examples merely illustrate the invention and many modifications can be made within the spirit and scope of the disclosure.

I claim:

1. In a process for the oxidation of ammonia to produce oxides of nitrogen which comprises passing an admixture of ammonia and oxidizing gas in contact with a catalyst pack at elevated temperature and pressure, in which pack about 10 to 50 layers of platinum group metal gauze would normally be used to obtain at least about 95 percent conversion of ammonia to nitrogen oxides, said gauze being at the gas inlet of said pack and having resistance to gas flow causing a pressure drop across said gauze, the improvement which comprises using in said pack in lieu of about one-third to two-thirds of said gauze, a foraminous, corrosion resistant, non-precious metal structure in the form of randomly oriented metal located in said pack downstream of said gauze with respect to gas flow, said foraminous structure having a porosity such that it has resistance to gas flow and causes a pressure drop so that the pressure drop across the combined gauze and foraminous structure is substantially equal to the pressure drop across said normal amount of gauze.

2. A process in accordance with claim 1 wherein the foraminous structure is fabricated from Inconel or Nichrome wires.

3. A process in accordance with claim 2 wherein the foraminous structure is made of knitted metal mesh compressed to form a pad of randomly oriented metal.

4. A process in accordance with claim 1 wherein the reaction product is used as a step in the production of nitric acid and wherein the platinum group metal catalyst is present in said catalyst pack in an amount of 0.5 to 1.5 troy ounces, calculated on the basis of metal per ton of daily nitric acid production.

5. A process in accordance with claim 1 wherein the foraminous structure is a compressed metal pad.

* * * * *